US005305926A

United States Patent [19]
Webb

[11] Patent Number: 5,305,926
[45] Date of Patent: Apr. 26, 1994

[54] PORTABLE FUELING FACILITY HAVING FIRE-RETARDANT MATERIAL

[75] Inventor: R. Michael Webb, Eau Claire, Wis.

[73] Assignee: U-Fuel, Inc., Eau Claire, Wis.

[21] Appl. No.: 607,567

[22] Filed: Nov. 1, 1990

Related U.S. Application Data

[63] Continuation-in-part of Ser. No. 332,462, Mar. 30, 1989, Pat. No. 4,988,020.

[51] Int. Cl.$^5$ .......................... B67D 5/00; B65D 25/00
[52] U.S. Cl. .................................. 222/183; 220/88.1; 220/464
[58] Field of Search .................. 280/838; 222/51, 131, 222/183, 155; 141/86, 45; 220/D24, 859, 88.1, 444, 452, 900, 464; 428/74; 169/66

[56] References Cited

U.S. PATENT DOCUMENTS

| | | | |
|---|---|---|---|
| 150,606 | 5/1874 | Perkins | 220/88.1 X |
| 450,494 | 4/1891 | Proctor | 222/51 |
| 923,183 | 6/1909 | Johnson | 222/51 X |
| 1,263,751 | 4/1918 | Elkins | 222/155 |
| 1,331,615 | 2/1920 | Brady | 222/51 |
| 1,562,991 | 11/1925 | Rudigier | 222/131 |
| 1,588,863 | 6/1926 | Walker | 220/88.1 X |
| 1,604,257 | 10/1926 | Brooks | 220/88.1 X |
| 1,908,684 | 5/1933 | Buchanan | 220/DIG. 24 X |
| 2,056,179 | 10/1936 | Fitch | 280/188 |
| 2,141,638 | 12/1938 | Bean | 222/51 X |
| 2,189,945 | 2/1940 | Fitch | 220/DIG. 24 |
| 2,259,319 | 10/1941 | Norbom | 220/DIG. 24 |
| 2,285,830 | 6/1942 | Paget | 220/900 X |
| 2,307,616 | 1/1943 | Booth | 111/155 X |
| 2,327,475 | 8/1943 | Waugh | 222/173 |
| 2,425,962 | 8/1947 | Sill | 222/547 X |
| 2,757,823 | 8/1956 | Blanchard et al. | 222/155 |
| 2,784,747 | 3/1957 | Weempe | 280/838 |
| 2,792,148 | 5/1957 | Goldenberg | 222/2 |
| 3,172,566 | 3/1965 | Mullin et al. | 222/131 X |
| 3,172,581 | 3/1965 | Nanni | 222/464 |
| 3,240,388 | 3/1966 | Brainard | 222/51 |
| 3,366,280 | 1/1968 | Sampson et al. | 222/173 |
| 3,601,284 | 8/1971 | Yamawaki | 222/2 |
| 3,782,599 | 1/1974 | Luginbühl | 222/51 |
| 3,863,687 | 4/1975 | Alquist | 141/45 |
| 3,889,701 | 6/1975 | Mueller | 280/838 |
| 4,131,214 | 12/1978 | Rogers | 222/608 |
| 4,249,392 | 2/1981 | Hotta | 222/131 X |
| 4,354,620 | 10/1982 | Tsuenda et al. | 222/14 |
| 4,397,405 | 8/1983 | Batson | 222/14 |
| 4,403,075 | 9/1983 | Byrd et al. | 428/426 X |
| 4,469,129 | 9/1984 | Dixon | 220/88.1 X |
| 4,541,545 | 9/1985 | Beattie et al. | 220/88.1 X |
| 4,561,292 | 12/1985 | Pugnale et al. | 229/426 X |
| 4,615,362 | 10/1986 | Hartman et al. | 141/86 |
| 4,638,928 | 1/1987 | Webster | 222/155 OR |
| 4,784,902 | 11/1988 | Crompton | 428/284 X |
| 4,807,675 | 2/1989 | Sharp | 141/86 |
| 4,842,139 | 6/1989 | Krieg | 206/386 |
| 4,881,579 | 11/1989 | Sharp | 141/86 |
| 4,911,326 | 3/1990 | McGouran, Jr. | 220/855 X |
| 5,032,447 | 7/1991 | Bailey | 428/74 X |
| 5,038,456 | 8/1991 | McGarvey | 220/88.1 X |
| 5,081,761 | 1/1992 | Rinehart et al. | 220/444 X |
| 5,104,700 | 4/1992 | Peterson | 220/88.1 X |

FOREIGN PATENT DOCUMENTS

| | | | |
|---|---|---|---|
| 0944916 | 12/1963 | United Kingdom | 280/838 |
| 1007251 | 10/1965 | United Kingdom | 222/51 |

OTHER PUBLICATIONS

Jane's Airport Equipment, Sep. 1986.

Primary Examiner—Andres Kashnikow
Assistant Examiner—Anthoula Pomrening
Attorney, Agent, or Firm—Woodwock Washburn Kurtz Mackiewicz & Norris

[57] ABSTRACT

An improved portable fueling facility for aircraft or ground vehicles includes at least one storage tank, an outer tank for providing secondary containment about the storage tanks, a number of saddle members for supporting the outer tank on a flat horizontal surface and a pump for dispensing fuel. A deck compartment may be provided beneath the pumps for providing secondary containment about the supply pipes which are used to supply the pumps and the refueling tubes which are used to refuel the storage tanks. The entire facility is portable, so that it may be redeployed at different locations or airports as needed. Fire retardant material may also be provided between the storage tank and the outer tank to prevent flames from reaching the storage tank during an emergency.

2 Claims, 12 Drawing Sheets

PORTABLE FUELING FACILITY HAVING FIRE-RETARDANT MATERIAL

This is a continuation-in-part of Ser. No. 07/332,462, which was filed Mar. 30, 1989, now U.S. Pat. No. 4,988,020. The disclosure of the parent patent is hereby incorporated by reference.

BACKGROUND OF THE INVENTION

1. Field of the Invention

The present invention relates to an improved portable fueling facility of the type which may be deployed at an airport or other desired refueling location. More specifically, the invention relates to an improved fueling facility which has improved secondary containment characteristics, is easily deployable at a desired location and that does not need an attendant to effect a refueling transaction.

2. Description of the Prior Art

Nearly all modern airports have facilities of some type for refueling. The most prevalent type of aircraft refueling facility includes a below-ground storage tank and an above-ground pumping module which is operated by an attendant, much in the manner of commercial service stations for automobiles.

One significant disadvantage of such in-ground refueling stations was the time and labor involved in preparing such a facility. Some factors which contribute to the expense of constructing such a below-ground facility include the need for construction permits, subcontractors, excavation and the time and planning involved in locating a permanent site for the facility. Once installed, such facilities could not practically be moved to different locations at the airport, to other airports, or be sold.

In recent years, some above-ground refueling facilities have become commercially available. One example is the Edghill Airfield fueling installation which is commercially available from H. W. Edghill Equipment, of Basing Stoke, Hampshire, England. This facility includes a pair of tanks which are manifolded together and are mounted on a hard surface by a skid. A remotely positioned electrically powered dispensing unit is provided to dispense the fuel. However, this dispensing unit also requires the presence of an attendant to monitor the refueling transaction.

In many small airports throughout the United States and the world, it is difficult for a pilot to refuel his or her aircraft at irregular times when an attendant is not present at the airport's refueling facility. As a result, a pilot may be effectively prevented from beginning or resuming a flight until an attendant is again on duty.

In addition, many commercial service stations for automobiles have limited operational hours. When an attendant is not on duty at such stations, a traveler cannot refuel his vehicle.

Another problem with existing above-ground fuel storage facilities is the possibility of catastrophic fire or explosion if surrounding facilities catch on fire.

It is clear there has existed a long and unfilled need in the prior art for a portable above-ground refueling facility for refueling aircraft or ground vehicles which has adequate protection against fuel leakage, is readily deployable at a desired refueling location and does not require an attendant to effect a refueling transaction.

SUMMARY OF THE INVENTION

Accordingly, it is an object of the invention to provide an improved portable aircraft refueling facility which is effective at preventing unwanted fuel leakage, is readily deployable at a desired location and which does not require an attendant to effect a refueling transaction.

It is further an object to provide an above-ground fueling facility which is insulated against fire or extreme temperature conditions.

It is yet further an object of the invention to provide a portable aircraft refueling facility which provides clean fuel for pumping.

It is yet further an object of the invention to provide an improved portable fueling facility having a system for automatically preventing dangerous over-filling of its storage tank.

It is further an object of the invention to provide an improved portable refueling facility in which fuel is loaded and unloaded with a minimum of spillage.

In order to achieve these and other objects of the invention, an improved portable fueling facility according to one aspect of the invention includes a storage tank for storing fuel; outer tank structure for preventing secondary containment about the storage tank; structure for supporting the outer tank on a flat surface; pump structure adapted for dispensing fuel into a vehicle; supply pipe structure for guiding fuel from the storage tank to the pump structure; and thermal insulation material positioned between the storage tank and the outer tank, whereby fuel in the storage tank will be insulated against extreme temperature conditions such as a fire emergency outside the outer tank.

An improved portable fueling facility according to a second aspect of the invention includes the storage tank, the outer tank structure, the supporting structure, the pump structure and the supply pump structure, the supply pump structure including an intake conduit in the storage tank which has a fuel intake orifice defined in one end thereof; structure for mounting the intake conduit so that the intake orifice is constrained to pivot about a point which is proximate a bottom intake surface of the storage tank; and float structure for maintaining the intake orifice at a predetermined distance beneath the upper surface of fuel and the storage tank, whereby clean fuel is obtainable from the storage tank with a minimum of passage length.

A fueling facility according to a third aspect of the invention includes the storage tank, the outer tank structure, the supporting structure, the pump structure, the supply pipe structure, a fill pipe in communication with the storage tank, the fill pipe being adapted for attachment to a refueling truck for refilling the storage tank; and fill limit valve structure for preventing fuel from entering the storage tank through the fill pipe when the fuel level and the storage tank reaches a predetermined maximum, whereby dangerous overfilling of the storage tank is prevented.

A portable fueling facility according to a fourth aspect of the invention includes a storage tank; outer tank structure; supporting structure; pump structure; supply pipe structure; and a stage II vapor recovery conduit adding a first end position proximate a top inside surface of the storage tank and a second end attached to the pump structure for recovering vapor which is displaced from a vehicle during refueling.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
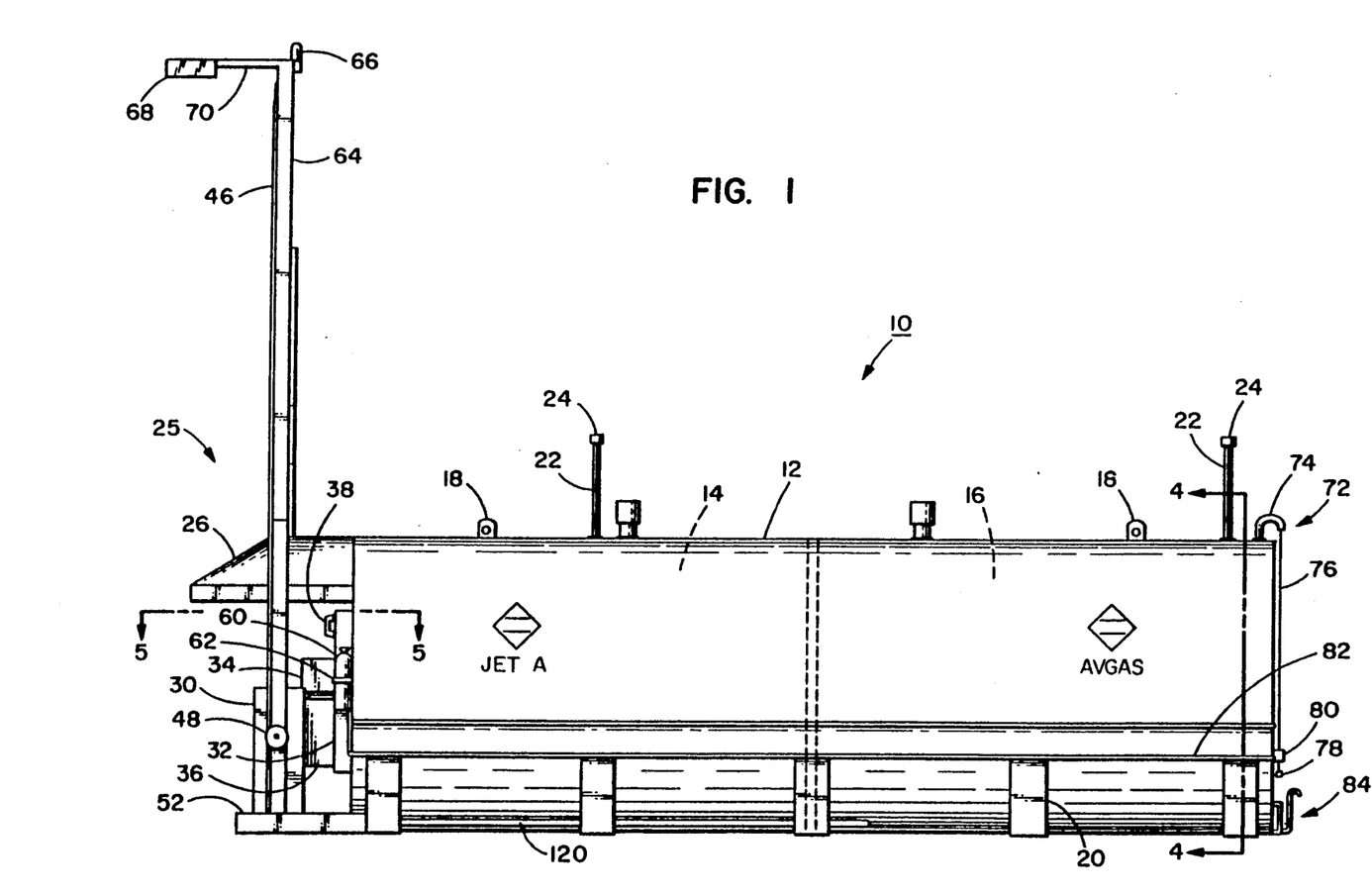
FIG. 1 is a side elevational view of a portable refueling facility constructed according to a preferred embodiment of the invention.

Referring now the drawings, wherein like reference numerals designate corresponding structure throughout the views, and in particular referring to FIG. 1, an improved refueling facility 10 includes an outer tank 12, a front inner storage tank 14 and a rear inner storage tank 16. The front and rear storage tanks 14, 16 are both disposed within outer tank 12, which provides secondary containment about both inner storage tanks 14, 16 in order to provide effective detection and prevention of leakage from the inner tanks 14, 16. A pair of lifting lugs 18 are provided on an upper surface of outer tank 12 in order to permit the facility 10 to be moved via a crane or like lifting device to a desired location. The facility 10 and, more specifically, outer tank 12 is supported relative to a flat horizontal surface such as concrete platform or a paved surface by a plurality of saddle members 20, each of which have a flat lower surface and a concave upper surface which receives a lower portion of outer tank 12. As is illustrated in FIG. 1, both the front storage tank 14 and the rear storage tank 16 are in communication with a respective vent pipe 22 which has a valve 24 mounted at a second end thereof. Valve 24 is constructed to allow air or vapors to flow into and out of the respective tank 14, 16. However, valve 24 acts as a check valve to minimize fuel vapors from leaving vent pipe 22 during refilling or expansion. This is accomplished by a spring actuator within valve 24 which causes the valve to seat until pressure or a vacuum builds up in the tank 14, 16.

Figure 2:
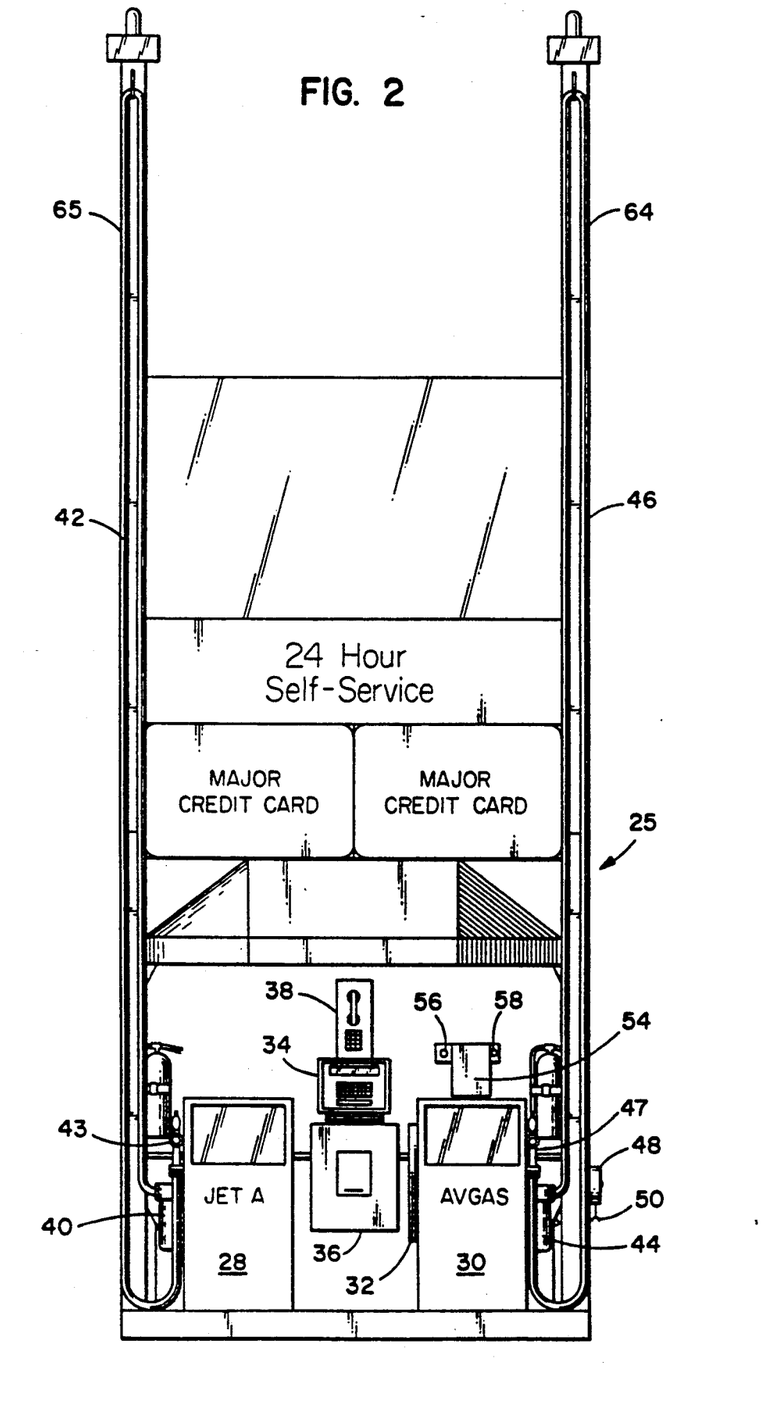
FIG. 2 is a front elevational view of the facility depicted in FIG. 1.

Referring briefly to FIG. 2, facility 10 includes a fueling station 25 which has a protective canopy 26, a first pump 28 and a second pump 30 which are beneath the canopy 26. In the illustrated embodiment, first pump 28 is dedicated to the front storage tank 14 and is used to dispense jet A fuel, while second pump 30 is dedicated to rear storage tank 16 and is used to dispense AVGAS. Operation of both pumps 28, 30 is controlled by means of a pump control unit 32 in a manner which will be described in greater detail below.

One attractive feature of a fueling facility constructed according to the invention is its capability to accommodate self-service refueling by accepting major commercial credit cards. To effect this capability, a credit card reader 34 is provided in fueling station 25. A receipt printer 36 is positioned beneath card reader 34 to provide a tangible verification of the refueling transaction to the pilot for his or her financial records. A telephone 38 is provided above card reader 34 in order to enable a pilot to communicate any inquiries or complaints to a central customer support facility.

In operation, first pump 28, when activated, will pump fuel from front storage tank 14 through a first filter unit 40 into a first hose 42 to a nozzle 43, which may be held by the pilot during the refueling process. Similarly, second pump 30, when activated, pumps fuel from rear storage tank 16 through a second filter unit 44 into a second hose 46 to a nozzle 47. Nozzle 47 may also be of the hand-held type, in which case an operator may hold the nozzle 47 during refueling. Alternatively, nozzle 43 may be of the type which is securable to the refueling port in an airplane. In this second case, the operator is required to depress a dead man switch 58 during the entire refueling process in order to permit operation of pump 28. In this way, refueling is disrupted should an unexpected emergency occur.

Before refueling, an operator will ground the aircraft by means of a cable attachment 50 which is unwindable from a grounding reel 48, as is shown in FIGS. 1 and 2. Grounding reel 48 is electrically connected to the frame of fueling facility 10. As a result, arcing between facility 10 and the aircraft due to differences in electrical potential therebetween is prevented.

Referring again to FIG. 1, it will be observed that pumps 28, 30 are mounted upon a deck compartment 52, the construction of which provides important advantages according to the invention. Deck compartment 52 defines a compartment or space therein through which the fuel lines between tanks 14, 16 and pumps 28, 30 respectively pass. As a result, secondary containment is achieved beneath all pipe connections for the entire fueling facility 10.

Referring briefly to FIG. 2, fueling station 25 further includes an electrical panel 54 through which electrical lines for operating the pumps 28, 30, card reader 34, receipt printer 36 and pump control unit 32 are routed. An emergency shut-off switch 56 is provided adjacent electrical panel 54, as is the dead man switch 58 that has previously been discussed. A pair of fire extinguishers 60 are further mounted at fueling station 25 by a respective pair of clamps 62 as is shown in FIGS. 1 and 2.

Another novel aspect of the invention concerns a novel fueling hose retracting arrangement which includes a pair of retractor columns 64, 65 which are mounted at outer ends of fueling station 25 adjacent pumps 30, 28 respectively. Each retractor column 64, 65 includes an aircraft warning light 66, an illumination source 68 and an arm 70 for supporting illumination source 68. The construction of the hose retracting arrangements within retractor columns 64, 65 is discussed in greater detail below.

In order to monitor the fuel level in rear storage tank 16, a tank gauge 72 includes a tape 76 which is attached to a float within tank 16 and extends from tank 16 to a position outside outer tank 12 through a gauge tape housing 74. Tape 76 is urged downwardly by a weight 78. By observing the position of weight 78, the fuel level within rear storage tank 16 can be determined. In addition, a leak detection gauge 84 is provided for measuring the amount of fluid which has collected in the interstitial space between tanks 14, 16 and the outer tank 12. The operation of leak detection gauge 84 will be discussed in greater detail below.

Figure 3:
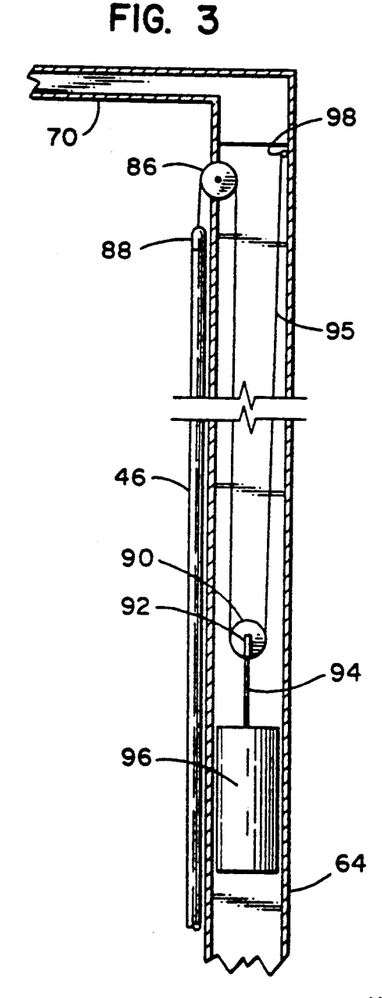
FIG. 3 is a diagrammatical view illustrating operation of a hose retractor mechanism in an apparatus constructed according to the embodiments of FIGS. 1 and 2.
Figure 4:
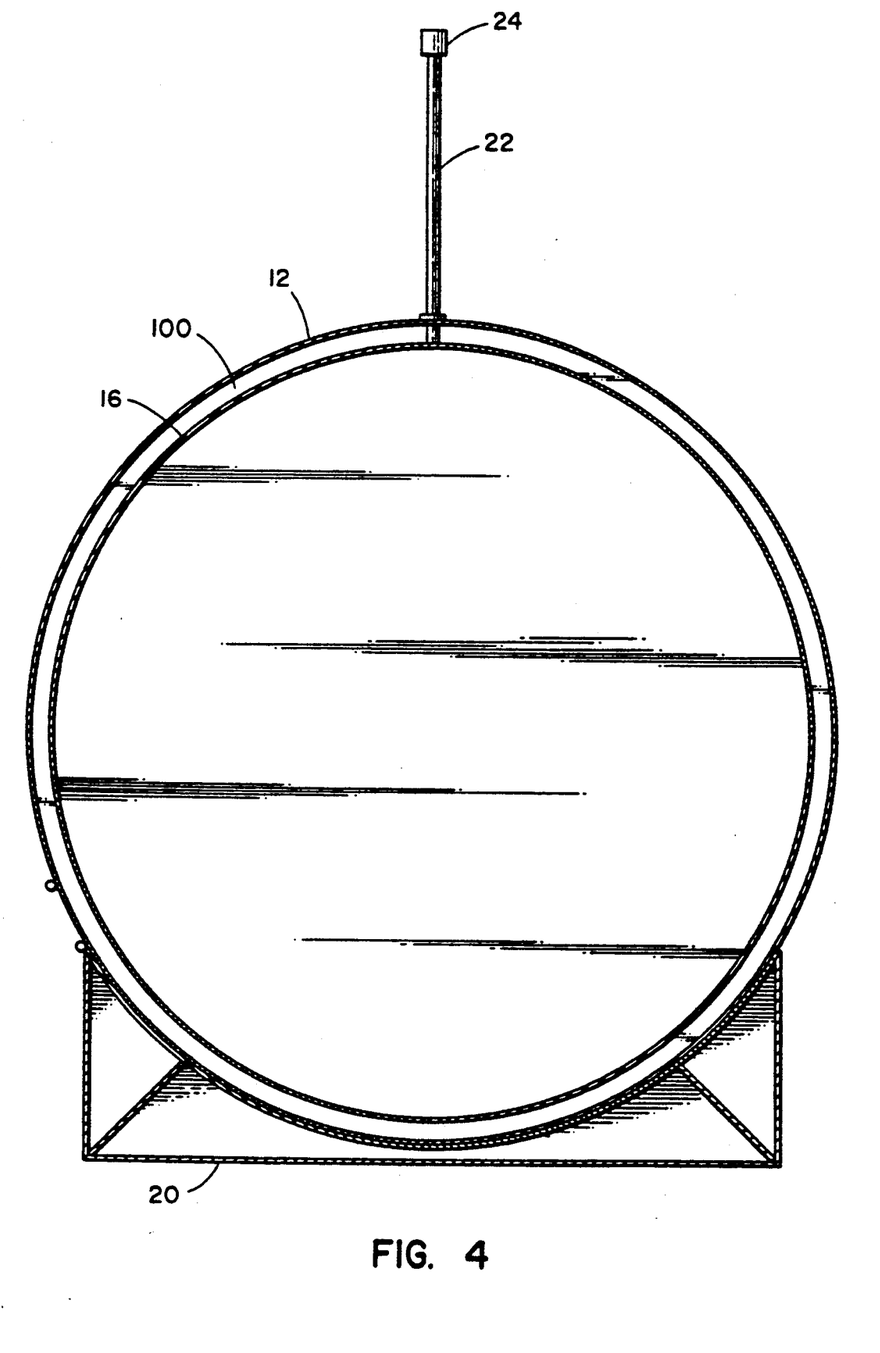
FIG. 4 is a cross-sectional view taken along lines 4—4 in FIG. 1.

Referring now to FIG. 3, the specifics of the hose retractor arrangement that is positioned within both retractor columns 64, 65 will now be discussed. The retractor arrangement includes a first pulley 86 which is rotatably mounted to a retractor column 64. A swivel-type hose support bracket 88 is used to support a central portion of a respective one of the fueling hoses 42, 46, as is shown in FIG. 3. A second counterweight pulley is rotatably mounted to a connecting rod 94 by means of a clevice 92. Connecting rod 94 is in turn secured to a counterweight 96 which is of sufficient mass to exert a relatively strong downward force on counterweight pulley 90. A retractor cable 95 is secured to hose support bracket 88 at a first end thereof and has a second end which is secured to retractor column 64 by a cable tie-down member 98. Cable 95 stretches over the first and second pulleys 86, 90 in the manner illustrated in FIG. 3 so that the weight of counterweight 96 is transmitted to support bracket 88 in the form of an upward bias which causes the hose 46 to be withdrawn to a retracted position until a greater downward force is exerted thereon by an operator during the refueling process. It should be noted that the pulley arrangement described above and illustrated in FIG. 3 constitutes a force magnification linkage which applies twice the amount of upward force on hose 46 than is exerted downwardly by counterweight 96. The above-described retraction arrangement provides a smooth non-disruptive retraction force, which insures that the respective hoses 42, 46 will be withdrawn from an aircraft when an operator ceases to impart downward force to nozzles 43, 47, respectively.

Figure 5:
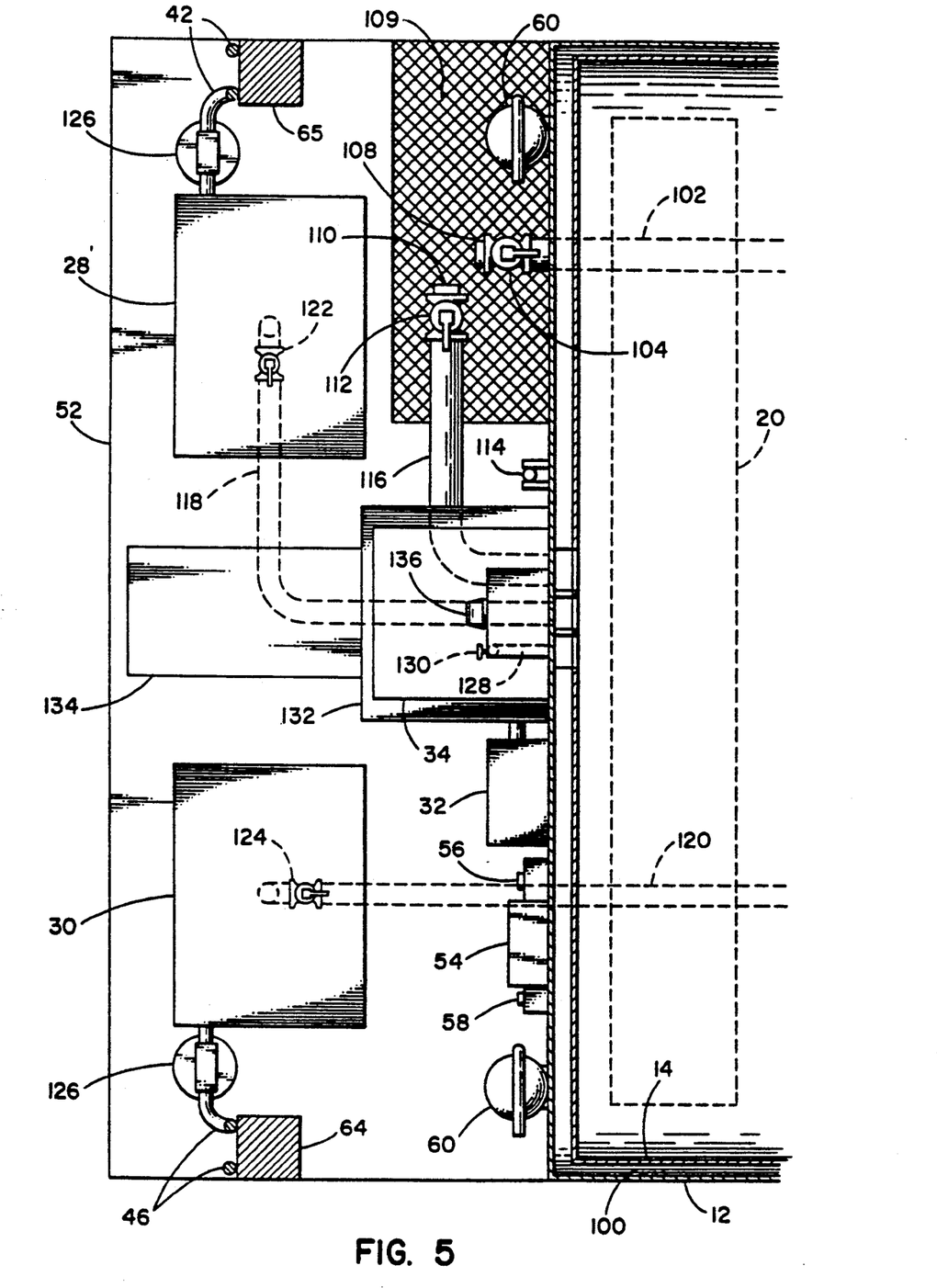
FIG. 5 is a fragmentary cross-sectional view taken along lines 5—5 in FIG. 1.

Referring now to FIG. 5, a fragmentary cross-sectional view looking down into an end portion of front storage tank 14 and deck compartment 52 depicts the interstitial space 100 which is defined between the front storage space 14 and outer tank 12. As is shown in FIG. 5, a rear tank fill tube 102 extends from the rear storage tank 16 to a nipple end 108. A gate valve 104 is interposed in fill tube 102 between rear tank 16 and nipple 108. When it is desired to refill rear tank 16, a source of fuel is connected to nipple 108 and gate valve 104 is opened, thereby permitting fuel to be pumped from the refueling source into rear tank 16 via fill tube 102. Similarly, a front tank fill tube 116 is provided in communication with front tank 14. Front tank fill tube 116 has a nipple end portion 110 and a gate valve 112 interposed between nipple portion 110 and the remainder thereof. When it is desired to refill front storage tank 14, an appropriate source of fuel is connected to nipple 110 and gate valve 112 is opened, thereby permitting fuel to be pumped into front storage tank 14.

As is shown in FIG. 5, both nipples 108, 110 are positioned above a grate 109 which permits fuel that is spilled during refilling to drop down into deck compartment 52. In this way, deck compartment 52 acts as a secondary containment for fuel spillage during refilling of tanks 14, 16.

In order to provide fuel from front storage tank 14, a front tank supply pipe 118 is connected to first pump 28, as is shown in FIG. 5. A valve 122 is provided within front tank supply pipe 118 in order to cut off the supply of fuel to first pump 28 during maintenance or in the event of an emergency. Similarly, a rear tank supply pipe 120 communicates rear tank 16 with second pump 30 and has a valve 124 interposed therein. Both pipe 118 and pipe 120 are routed through deck compartment 52 in order to provide secondary containment for fuel which is drawn therethrough.

Figure 6:
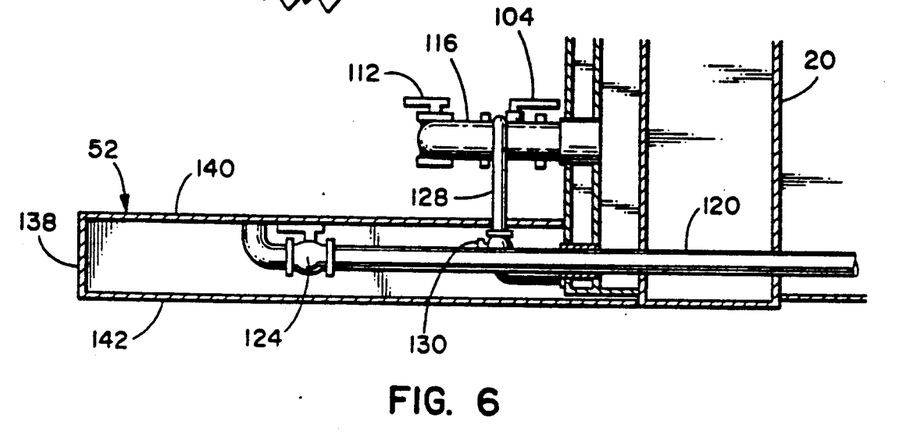
FIG. 6 is a cutaway view of the deck compartment illustrated in the embodiments of FIG. 1-5.

Referring now to FIG. 6, a water draw off line 128 having a valve 130 interposed therein is provided for drawing water off a bottom portion of first tank 14 in a manner that is known to those skilled in the art. Rear tank 16 is provided with a similar water draw off arrangement, as will be discussed below. An inspection hatch 134 is provided in deck compartment 52 for providing access during maintenance, refilling or in an emergency. As is best shown in FIG. 6, deck compartment 52 includes an end wall 138, an upper wall 140 and a lower wall 142. These walls along with a pair of side walls (not shown) define a compartment or space which provides secondary containment for the rear tank fill tube 102, the front tank fill tube 116, and for spillage from the front tank supply pipe 118 and the rear tank supply pipe 120. As a result, the facility 10 provides a high degree of safety and protection from accidental spillage or combustion due to fuel linkage.

Figure 7:
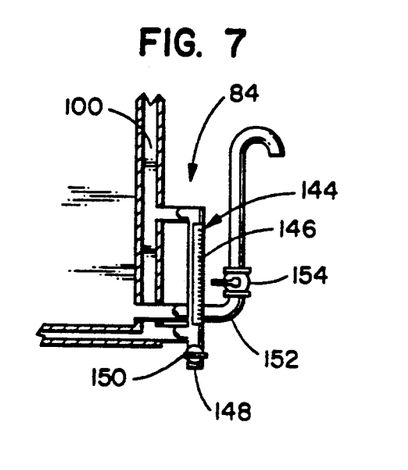
FIG. 7 is an enlarged fragmentary view of the leak detection gauge depicted in FIG. 1.

Referring now to FIG. 7, leak detection gauge 84 will now be discussed. Leak detection gauge 84 includes a transparent gauge tube 144, which is in communication with the interstitial space between second tank 16 and outer tank 12. Gauge tube 144 has measuring indicia 146 provided thereon for accurately measuring the level of fluid within gauge tube 144. A drain tube 148 extends downwardly from gauge tube 144 and has a valve 150 provided therein. As a result, leak detection gauge 84 can also be used to drain unwanted fluid from within the interstitial space 100. Also depicted in FIG. 7 is the water draw off line 152 which is provided for the rear tank 16. Line 152 has a valve 154 interposed therein and functions in a manner which is known to those skilled in the art.

Figure 8:
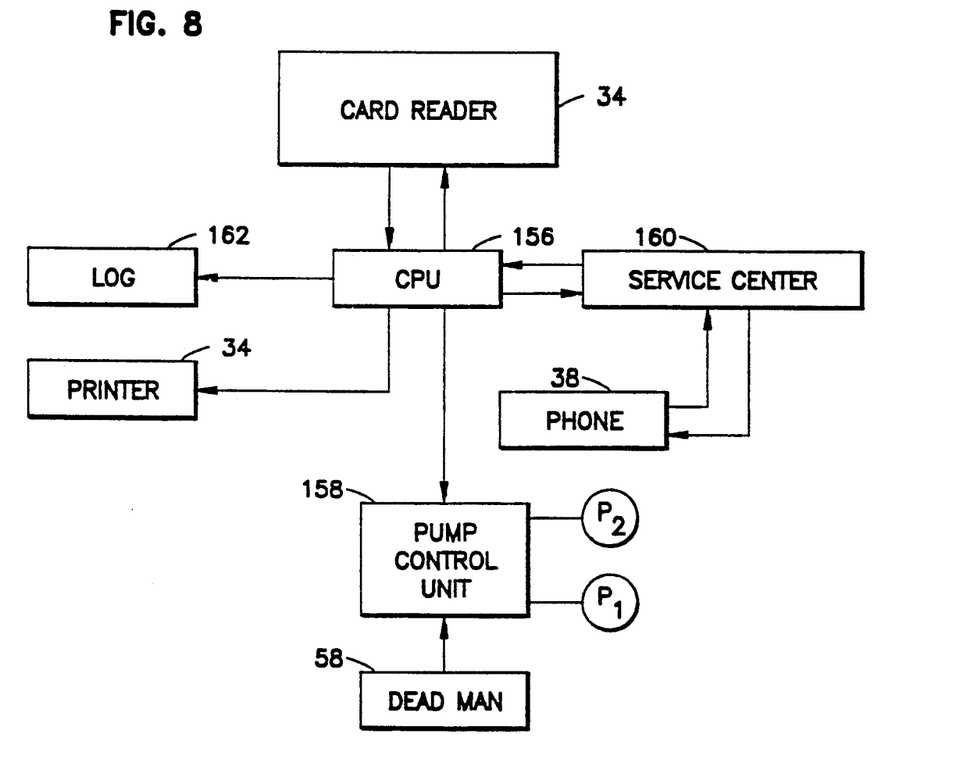
FIG. 8 is a schematic block diagram of a system which is used to control a refueling facility constructed according to the embodiment of FIGS. 1-7.

Referring now to FIG. 8, a system for controlling the first and second pumps 28, 30, which are labeled as $P_1$ and $P_2$, respectively for purposes of FIG. 8 will now be described. As is depicted in FIG. 8, card reader 34 is in communication with a central processing unit 156. Central processing unit 156 is arranged to instruct a pump control unit 158 when it is permissible to actuate one of the pumps $P_1$, $P_2$. A remote service center 160 can monitor and/or instruct CPU 156 on one or any refueling transactions which take place. Service center 160 is further in two-way voice communication with telephone 38. All transactions which occur at the improved facility 10 are recorded in a log 162, which is provided with information from the central processing unit 156. Receipt printer 34 is also given instructions by the central processing unit 156. Pump control unit 158 may further be responsive to the input of dead man switch 58 in the manner which is described above.

Figure 9:
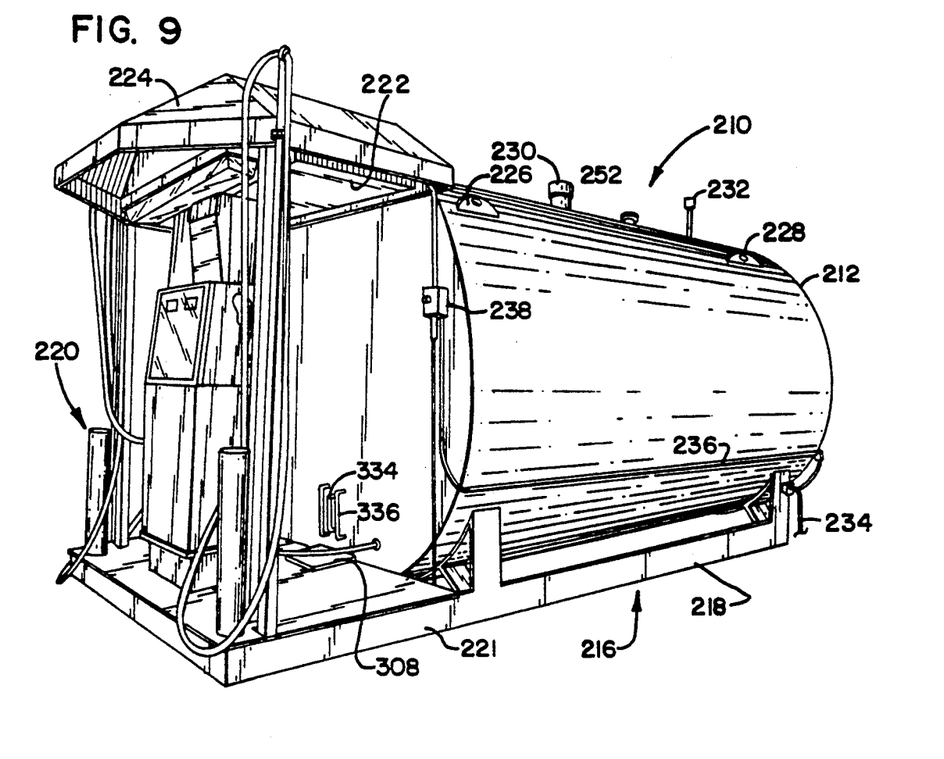
FIG. 9 is a perspective view of a portable fueling facility constructed according to a second embodiment of the invention.
Figure 10:
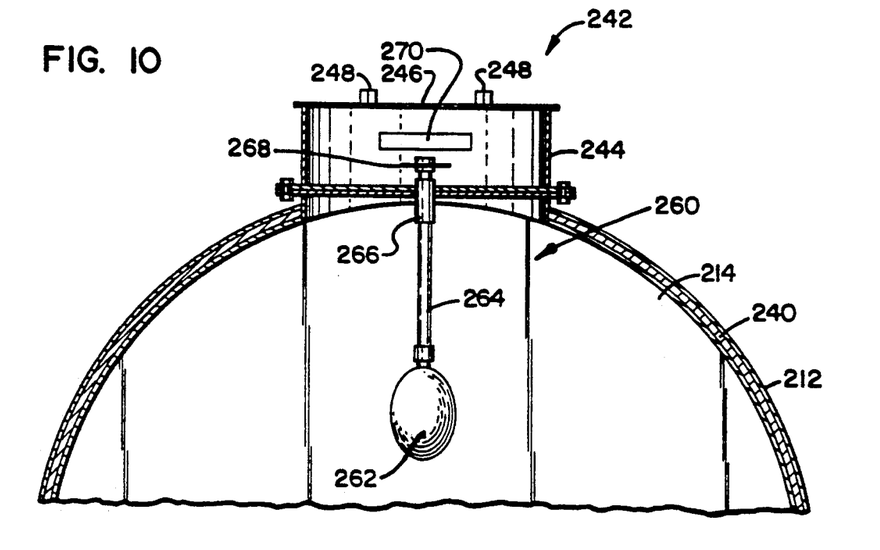
FIG. 10 is a fragmentary cross-sectional view of an upper portion of the embodiment of FIG. 9.

An improved portable fueling facility 210 constructed according to a second embodiment of the invention is depicted in FIGS. 9-16. Referring to FIG. 9, fueling facility 210 includes an outer tank 212 which is constructed to surround a storage tank 214. Structure 216 including a saddle member 218 is provided for supporting the outer tank 212, as may be seen in FIG. 9. A pump assembly 220 is provided on top of a deck compartment 221, in the manner described above with reference to the previous embodiment. A fire suppression system 222 is contained in a hood 224 which is attached to outer tank 212 and extends above pump assembly 220. The fire suppression system 222 is commercially obtainable from ADX as Series 9000 Dry Chemical Spot Protection System.

Referring again to FIG. 9, facility 210 includes at least two lugs 226, 228 which are provided on an upper surface of outer tank 212. Lugs 226, 228 are adapted to be engaged by a crane or similar device for locating the facility 210 in a desired location. An emergency vent 230 is further provided on an upper surface of outer tank 212, and is in communication with storage tank 214, as may be seen in FIG. 11. Emergency vent 230 is of known construction, and is designed to allow vapor to escape and safely burn off in the event of a catastrophic fire or other emergency. A pressure/vacuum vent 232 is also provided on an upper surface of outer tank 212 so as to be in communication with storage tank 214. Vent 232 is designed to open when subjected to more than eight (8) ounces per square inch of positive pressure or one-half ounce per square inch of negative pressure, thereby allowing storage tank 214 to breathe without allowing vapor therein to escape during normal operating conditions. Vent 232 is of known construction.

Facility 210 is connected to a power source 234 via an electrical cable 236 which is routed through an emergency cutoff switch 238. The electrical system for facility 210 is similar to that described above with reference to the previous embodiment.

One novel aspect of facility 210 is the provision of insulation material 240 in the interstitial space which exists between outer tank 212 and storage tank 214. Preferably, insulation material 240 is Kaowall 2300 ceramic fiber blanket, but it may alternatively be formed of similar fire-retardant materials. During normal operating conditions, insulation material 240 protects tank 214 against external temperature conditions which could otherwise cause fuel therein to expand or contract. In the event of a fire, insulation material 240 retards transmission of heat to storage tank 214, thereby providing extra time which could be used to extinguish the fire or to escape from its vicinity.

Referring now to FIGS. 10-13, the fueling facility 210 is provided with a receptacle 242 which is mounted to the upper surface of outer tank 212. Receptacle 242 is in the preferred embodiment formed by a single cylindrical side wall 244 which is sealed at a bottom edge to the upper surface of outer tank 212 by welding or a similar process. The upper edge of side wall 244 defines an opening which is selectively exposed or closed by a lid 246, which is pivotally secured to side wall 244 by means of a hinge 248. As can best be seen in FIG. 13 an upper portion of side wall 244 is removably mounted to a lower portion thereof by a plurality of bolts (not numbered) which engage flanges on the respective side wall portions. This permits removal of receptacle 242 in order to permit access to the storage tank, as will be appreciated by the view presented in FIG. 13.

Figure 11:
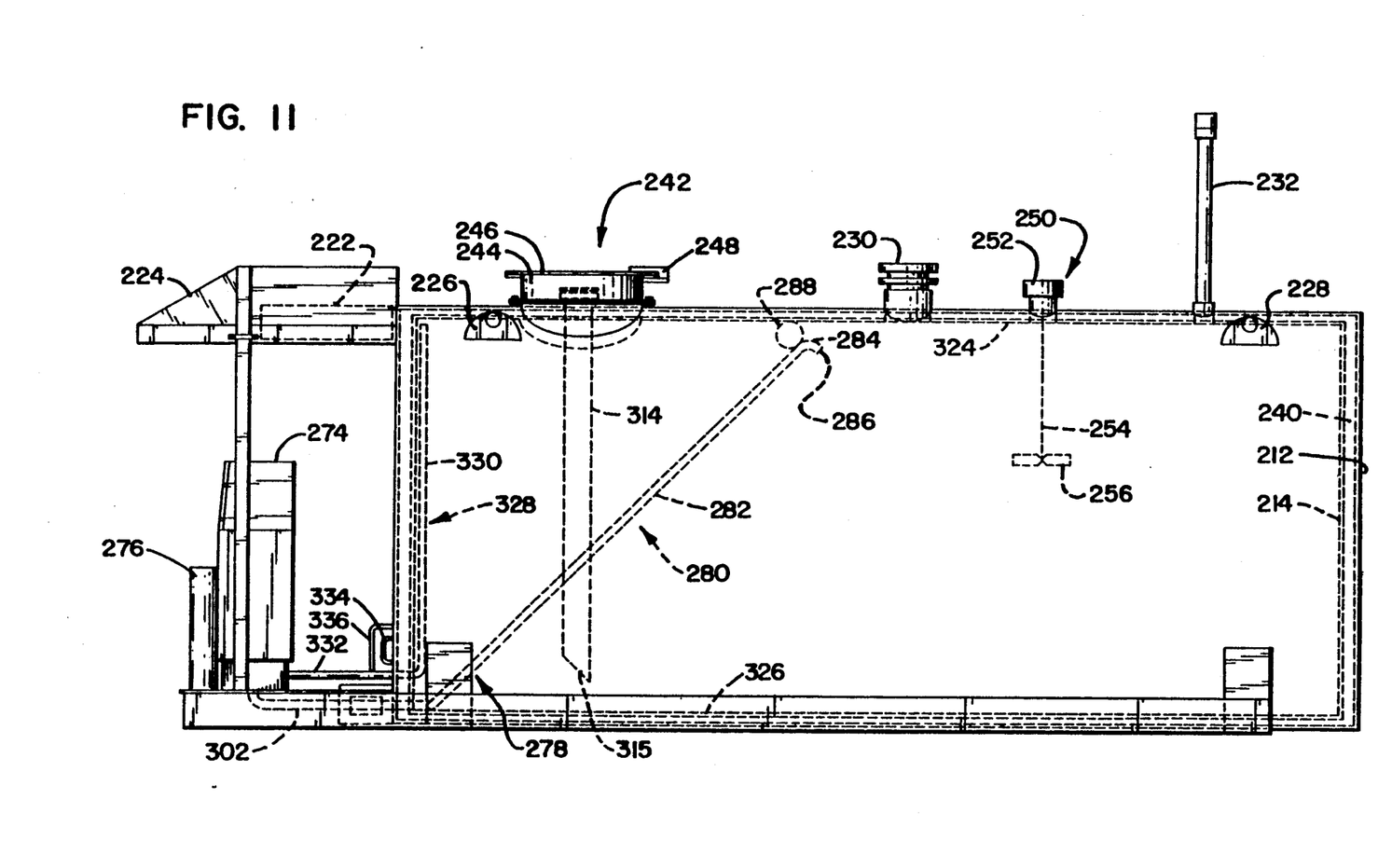
FIG. 11 is a longitudinal cross-sectional view through the embodiment of FIGS. 9 and 10.
Figure 12:
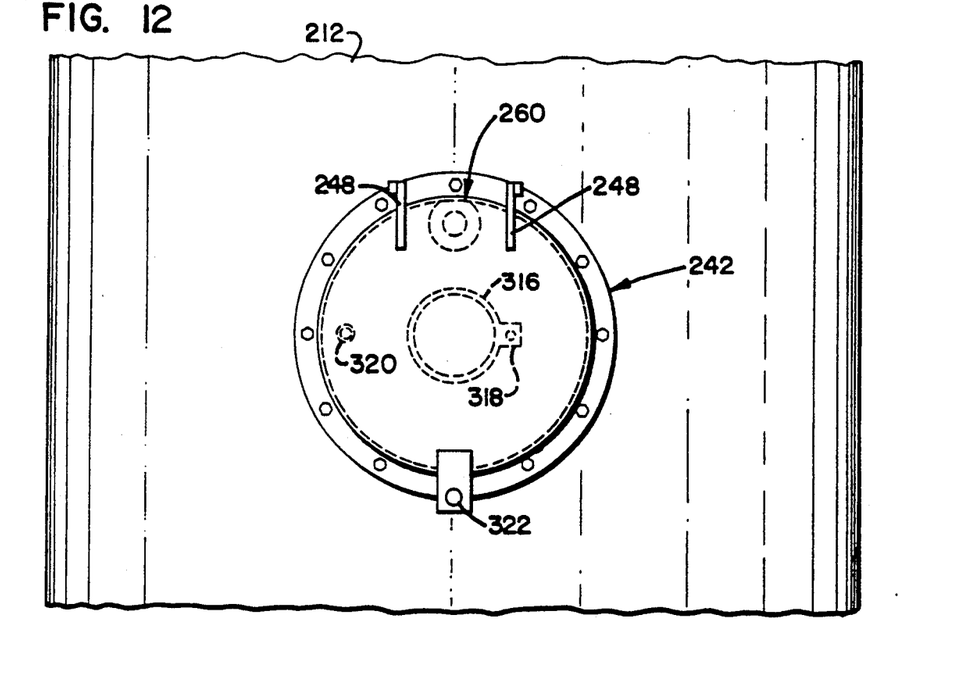
FIG. 12 is a fragmentary top plan view of a receptacle component in the embodiment of FIGS. 9-11.

Referring to FIG. 11, a gauge 250 for measuring the volume of fuel in storage tank 214 is provided on a top surface of outer tank 212. Volume gauge 250 includes a gauge body 252 from which a cable 254 supporting a float 256 within storage tank 214 is supported. An optical readout on gauge body 252 indicates the amount of cable 254 that has been played out, thereby determining the volume of fuel within storage tank 214. The readout itself is calibrated in terms of volume, rather than the length of cable that has been played out. Gauge 250 is commercially available from Scully Gage Company, as Model 3100.

Figure 13:
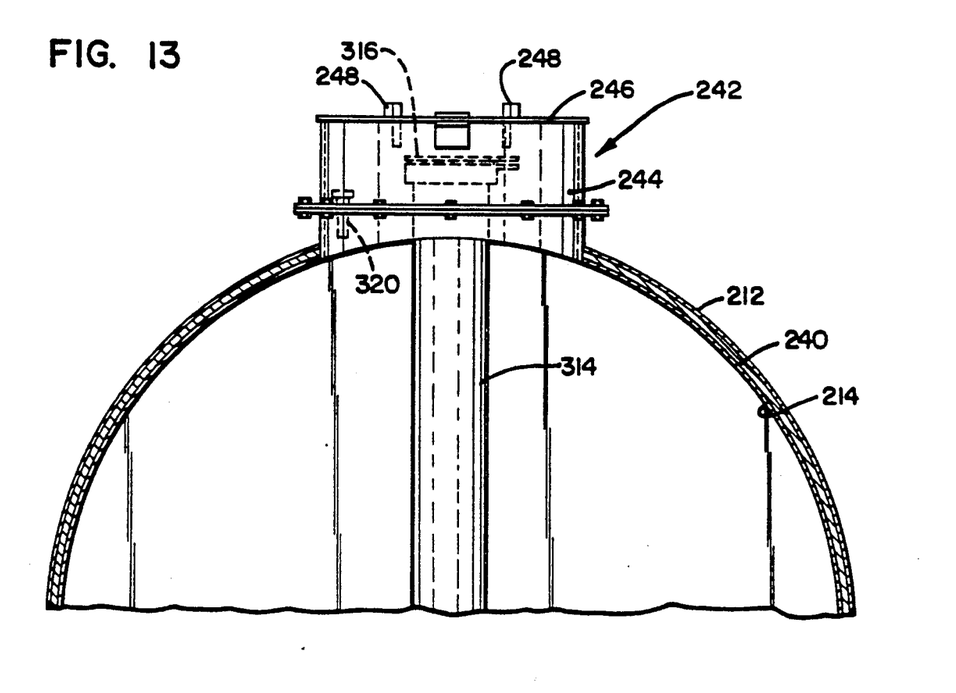
FIG. 13 is a fragmentary cross-sectional view through the receptacle component in the embodiment of FIGS. 9-12.
Figure 14:
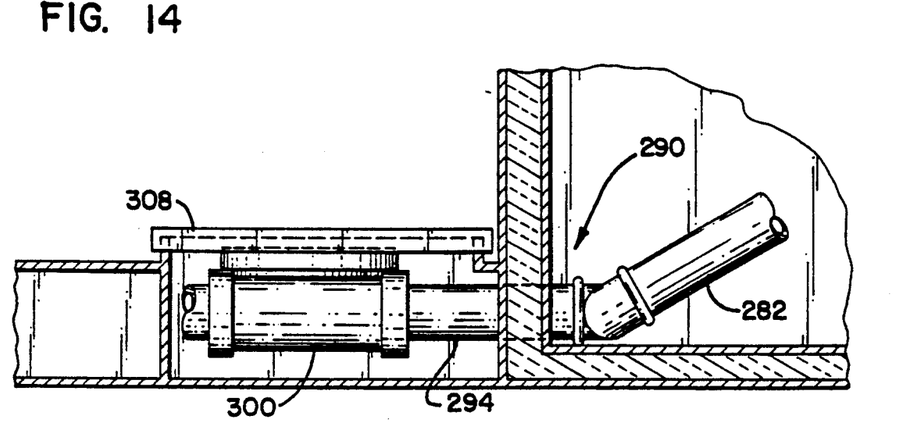
FIG. 14 is a fragmentary cross section through a pivotable supply pipe arrangement in the embodiment of FIGS. 9-13.

Referring to FIG. 13, a drain tube 320 is provided between the space defined within receptacle 242 and the space within storage tank 214 for allowing fuel spilled in receptacle 242 to drain into storage tank 214. A fill indicating assembly 260 is also provided within receptacle 242. Fill indicating assembly 260 includes a float member 262, which is preferably copper-coated, a rod 264 and a sleeve 266 which communicates the space within receptacle 242 with the space within storage tank 214. Rod 264 is slidingly mounted within sleeve 266 and has an indicator disk 268 on an end thereof which extends into receptacle 242. Indicia 270 are provided on an inner surface of side wall 244. By viewing the position of disk 268 relative to indicia 270, an operator can determine when storage tank 214 has been filled to its predetermined maximum safe capacity.

A fill pipe 314 is also provided within receptacle 242. Fill pipe 314 communicates the space within receptacle 242 to a lower portion of storage tank 214, where fill pipe 314 terminates in a beveled end 315. The end of fill pipe 314 which extends into receptacle 242 is covered by a fill cap 316 that is attached to fill pipe 314 and opens by unscrewing lockable cover 318.

As may be seen in FIG. 11, pump assembly 220 includes a pump 274 and a pair of bumpers 276 which are provided on deck compartment 221 to protect pump 274 from accidental contact with a vehicle.

Facility 210 further includes a novel supply pipe structure 278 which includes an intake conduit 280 consisting of a rigid pipe 282 having an elbow portion 284 in which a fuel intake orifice 286 is defined. A float member 288 is mounted on an opposite side of elbow portion 284 from intake orifice 286. Rigid pipe 282 is pivotally supported at its lower end by a pivotal mounting structure 290, as may be seen in FIG. 14. Accordingly, as the level of fuel in storage tank 214 changes, float member 288 maintains the elbow portion 284 and thus orifice 286 at a position that is slightly beneath the upper surface of the fuel within tank 214. As a result, fuel which is drawn into intake conduit 280 is kept as free as possible from sediment, which tends to collect at the bottom inside surface 326 of storage tank 214.

Referring again to FIGS. 14 and 15, mounting structure 290 in its preferred embodiment is constructed from a first pipe elbow 292 which is connected at one end to a pump supply pipe 294. A second pipe elbow 296 is connected at one end to rigid pipe 282. A pipe nipple 298 is provided between second ends of the first and second pipe elbows 292, 296. Pipe nipple 298 may be threaded with respect to the elbows 292, 296 so as to allow relative rotation therebetween, or may be sealed with respect thereto in alternative manner.

Figure 15:
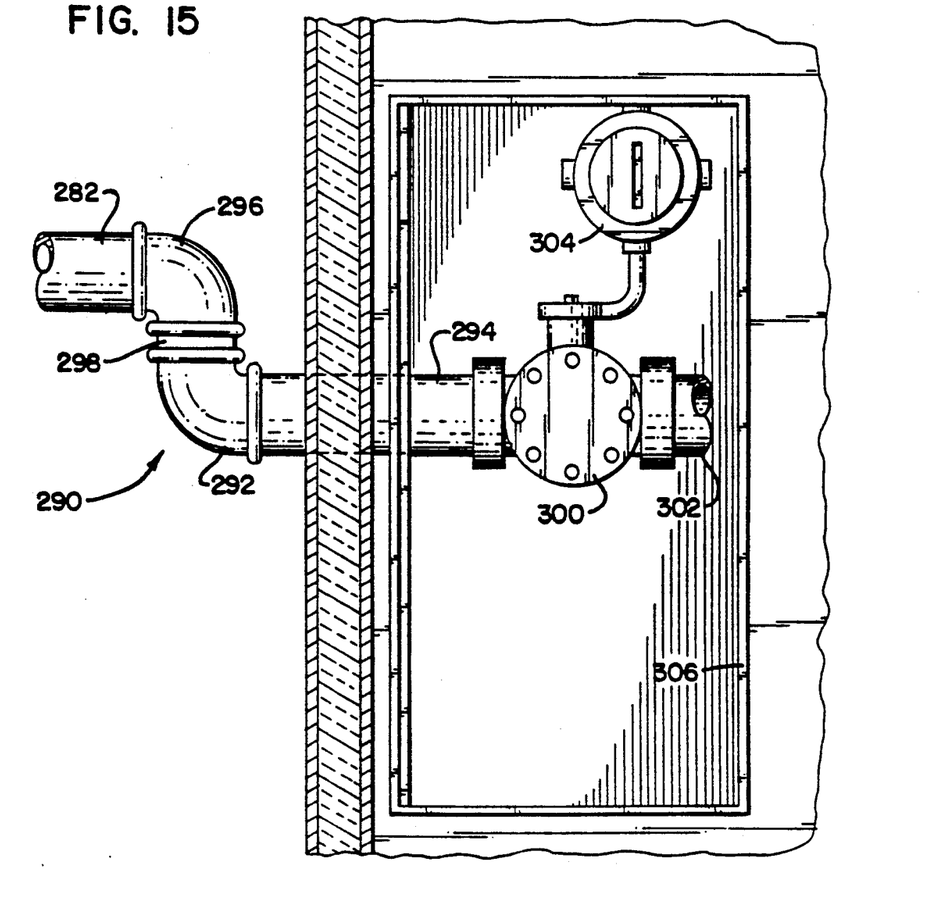
FIG. 15 is a cutaway fragmentary view of the arrangement depicted in FIG. 14.
Figure 16:
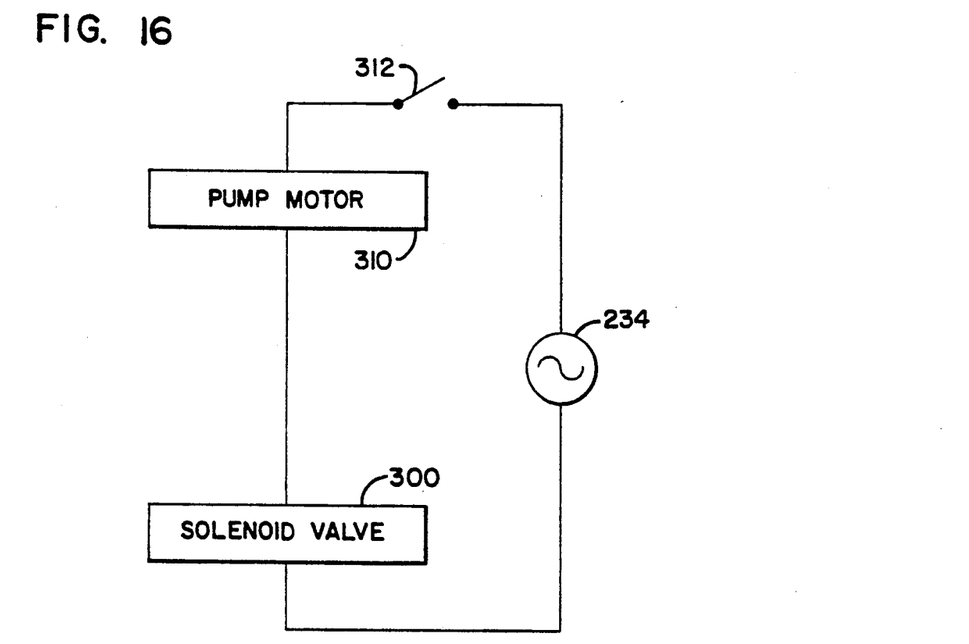
FIG. 16 is a schematic of a valve control circuit in the embodiment of FIGS. 9-15.

As may be seen in FIG. 15, a solenoid-controlled valve 300 is interposed between pump supply pipe 294 and a pipe 302 which leads to pump 274. Electrical connections to solenoid valve 300 are made through a sealed electrical junction box 304, which is provided within a deck compartment 221, as may be seen in FIGS. 14 and 15. A valve access cover 308 is provided on an upper surface of deck compartment 221 to provide access to valve containment box 306.

Solenoid valve 300 is constructed so as to be closed until it is electrically actuated to assume an open position. As may be seen schematically in FIG. 16, solenoid valve 300 is wired in series with a pump motor 310 within pump 274. When a switch 312 in pump 274 is actuated by an operator to its closed position, power from power source 234 flows through pump motor 310 and solenoid valve 300, thereby allowing fuel from intake conduit 280 to flow from storage tank 214 to the pump 274.

To refuel facility 210, an operator will undo the latch 322 and pivot lid 246 on its hinges 248 to an open position, in order to expose the fill pipe 314 within receptacle 242. The cap 316 is then removed from the top of fill pipe 314 by unscrewing it. A hose from a refueling truck is then connected to fill pipe 314 in a conventional manner. If, during refueling, fuel should spill into receptacle 242, it will drain into storage tank 214 via drain tube 320. During refueling, an operator monitors the position disk 268 relative to the indicia 270 which are provided on side wall 244. When disk 268 reaches the indicated maximum fill position, the refueling hose is disconnected from pipe 314, and cap 316 is closed. The lid 246 of receptacle 242 is then closed and locked by latch 322. During normal operation of the facility 210, fuel is dispensed via pump 274 through the intake conduit 280, which continuously adjusts its position to compensate for the changing level of fuel within storage tank 214. In the event of a fire or other emergency, fire suppression system 222 will act to automatically suppress fires in the vicinity of pump 274. The insulation material 240 will protect the fuel and storage tank 214 in order to provide time for the fire to be extinguished. During normal operation, an operator may check to see whether any leakage has occurred from storage tank 214 by monitoring an interstitial gauge 334 which is constructed as a transparent tube and is in communication with the interstitial space between storage tank 214 and outer tank 212. A pair of guards 336 are provided to protect the interstitial gauge 334.

When fuel is dispensed by pump 274 to a vehicle, a stage II recovery circuit 328 ensures that fuel vapor that is displaced from the tank of the vehicle will be recovered. Pump 274 is constructed so as to be able to recover such vapor from the tank, in a manner that is known in the art. An external vapor line 332 connects pump 274 to an internal vapor line 330 which extends within storage tank 214. Internal vapor line 330 terminates in an orifice near the top inside surface 324 of storage tank 214. As fuel is forced into the tank of a vehicle by pump 274, the vapor is displaced from the vehicle into the external vapor line 332 from where it passes into internal vapor line 330 to be emitted above the upper surface of the fuel in storage tank 214.

Figure 17:
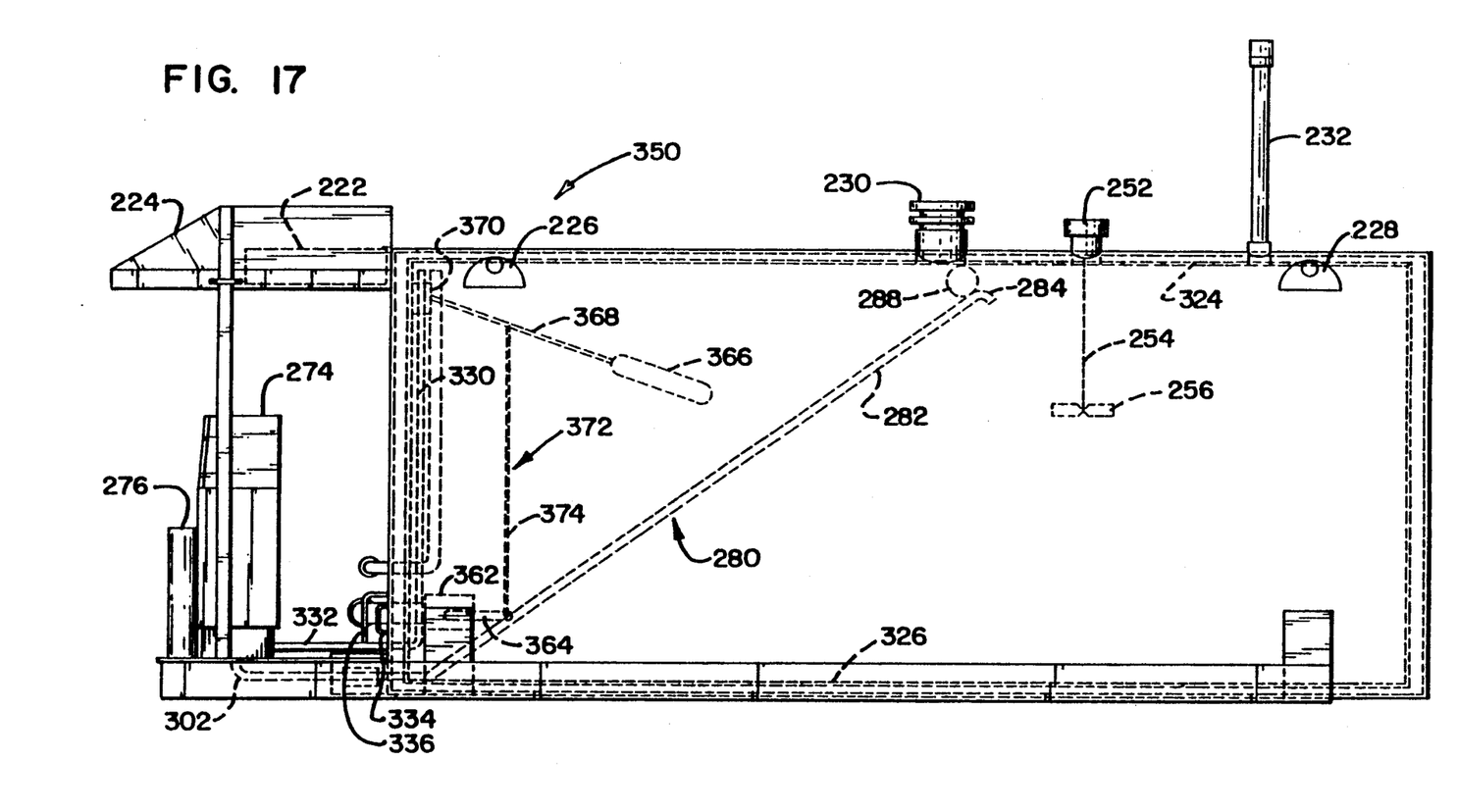
FIG. 17 is a longitudinal cross-sectional view through a portable fueling facility constructed according to a third embodiment of the invention.

A fueling facility 350 constructed according to a third embodiment of the invention is identical in all respects to facility 210 described in reference to FIGS. 9-16, except as specified hereinbelow. Facility 350 includes a bottom fill arrangement 352 which incorporates an external pipe 360 that is in communication with a valve body 362 provided within storage tank 314. External pipe 360 is provided with an adaptor 354 which is connectable to a standard refueling vehicle, a check valve 356 which allows fuel to flow into the tank but prevents reverse flow and a gate valve 358. Referring to FIG. 17, valve 362 is constructed so as to be opened and closed by an actuator arm 364. A float member 366 is pivotably connected to a side wall portion of the tank by a pivot mount 370 via a rod 368. Rod 368 is connected to actuator arm 364 via a linking structure 372, which in the preferred embodiment is a rod 374. Valve 362 is constructed so as to be in an open position when actuator arm 362 is in a downward position, and is closed when actuator arm 364 is drawn upwardly to a predetermined limit.

Figure 18:
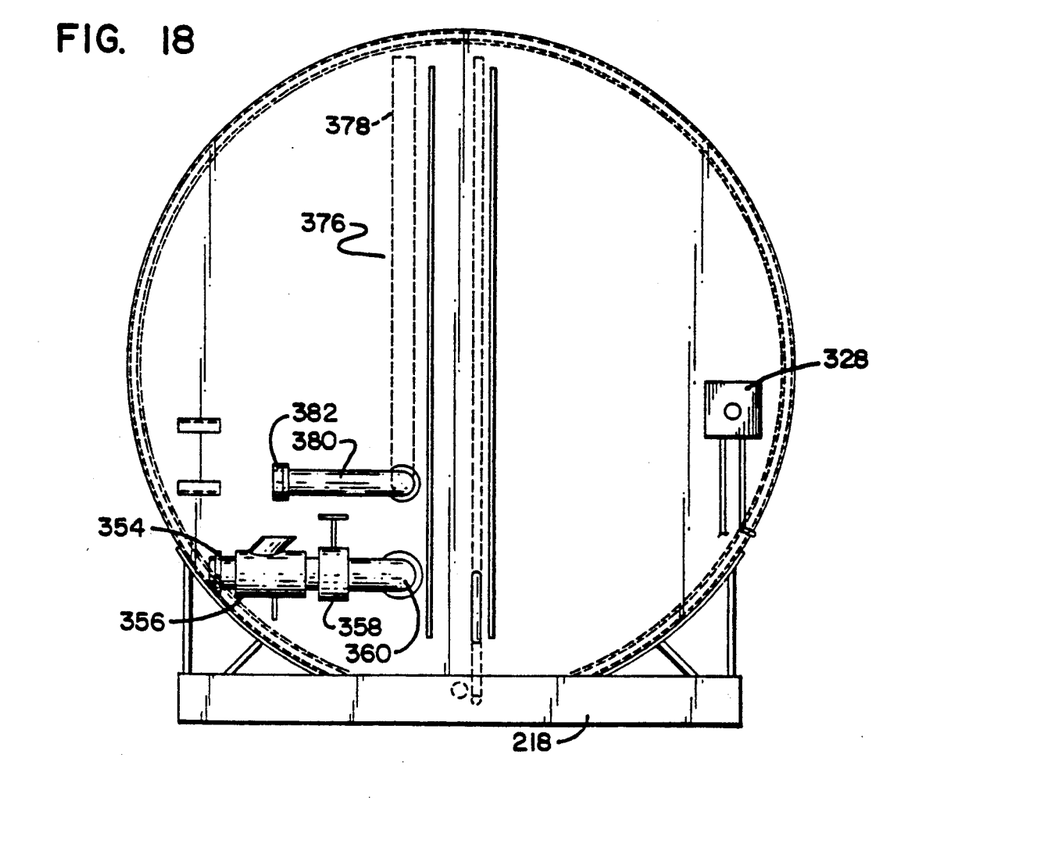
FIG. 18 is an elevational view of a portion of the system illustrated in FIG. 17.

Facility 350 further includes a stage I vapor recovery circuit 376 which consists of an internal vapor pipe 378 and an external pipe 380. Internal pipe 378 has an orifice which is positioned proximate the top inside surface 324 of the tank. Internal pipe 378 extends from its upper orifice downwardly parallel to a side wall portion of tank 314 to a location where it exits the tank and communicates with external pipe 380. A cap 382 is provided on the open end of external pipe 380, as may be seen in FIG. 18.

When it becomes necessary to refill the tank, a hose from a refilling truck is connected to adaptor 354, and gate valve 358 is opened. Fuel is then pumped into the tank via the external pipe 360, through the open valve 362. When the fuel within the tank reaches its predetermined maximum level, float member 366 will, via rod 368 and linking structure 372, pull actuator arm 364 to its predetermined upper limit, thereby closing valve 362. At this point, fuel is prevented from entering the tank. One advantage of the bottom fill mechanism is that the refilling process is automatically shut off without spilling fuel or overpressuring tank 314. During such refueling, vapor which is displaced from tank 314 enters internal pipe 378 through its upper orifice, and passes through external pipe 380 to a second hose leading to the refueling truck. In this way, the displaced vapor is recovered in the refueling truck, and is not passed into the environment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An improved portable fueling facility, comprising:
   a storage tank for storing a volatile fuel that has a boiling point less than water;
   outer tank means for providing secondary containment about said storage tank;
   means for supporting said outer tank means on a flat surface;
   pump means adapted for dispensing fuel into a vehicle;
   supply pipe means for guiding fuel from said storage tank to said pump means; and
   fire-retardant thermal ceramic fiber material positioned between said storage tank and said outer tank means, said storage tank being substantially supported within said outer tank means by said thermal ceramic fiber material, whereby said storage tank will be insulated against heat that would vaporize said volatile fuel for a prolonged period against flames and resulting extreme temperature conditions during a fire emergency which might occur outside said outer tank means.

2. A fueling facility according to claim 1, wherein said fire-retardant material is applied in blanket form.

* * * * *